United States Patent Office 3,190,197
Patented June 22, 1965

3,190,197
PROTECTIVE COLLOIDAL SILICA LACQUER FOR DEVELOPED PHOTOGRAPHIC PRINTS
Raymond G. Pinder, Rochester, N.Y., assignor to Eastman Kodak Company, Rochester, N.Y., a corporation of New Jersey
No Drawing. Filed Aug. 11, 1960, Ser. No. 48,806
6 Claims. (Cl. 95—1)

This invention concerns a lacquer for photographic prints which improves the appearance and which protects the surface against handling and ultraviolet light.

Colored photographic prints normally have a glossy finish. Moreover, these prints have surfaces which require care in handling since they are subject to spotting, abrasion, and the like, and may also be discolored due to the effect of ultraviolet light.

Various coating compositions have been suggested for protecting the surface of the prints including cellulosic layers which are attached to the surface by heat and pressure. Other coatings have been applied by brush or spray in order to protect the surface of the print. However, these coatings do not change the appearance of the print. Textured effects which are attractive have usually been obtained by using a photographic paper having a textured surface but this method has often not been convenient. It has been desired to have a method of treating a photographic print to provide a textured surface following the processing step. This permits prints to be obtained in mass production processing systems and subsequently treated to obtain prints having textured surfaces to meet the demands of various consumers.

Textured coatings have been known in the past particularly for application to metallic surfaces. However, many of these coating compositions would be unsuitable for application to a paper substrate, since a heating step is required to obtain the textured surface. In addition to desiring a coating which could be applied to a paper print without high heat to obtain a textured surface, it was also required to have a coating composition which would provide a clear hard surface, which would be compatible with a photographic print, and in which could be incorporated ultraviolet light absorbers. For a coating composition to be suitable for customer use, it is necessary that it remain in condition for use after a period of standing.

I have discovered a photographic print lacquer which can be used to protect surfaces of black and white and colored photographic prints by providing a hard clear surface over the photographic image which also pleasantly causes the light to diffuse and to enhance the appearance of the print.

One object of this invention is to provide a photographic print lacquer having a hard clear surface. A further object is to provide a method for protecting photographic prints against damage by handling such as abrasion, spotting, and the like. A further object is to provide a print lacquer which can be used to obtain a textured finish over photographic prints. An additional object is to provide a method of protecting colored photographic prints against ultraviolet degradation. The above objects are obtained by combining a copolymer of vinyl acetate and vinyl chloride with colloidal silica in a compatible organic volatile solvent mixture. The solvents, silica, and resin combine in such a manner as to provide a thixotropic mixture which controls the texture obtained during the application of lacquer.

The copolymer of vinyl chloride with vinyl acetate may be prepared from a monomeric mixture containing from 95% to 70% vinyl chloride and having a molecular weight of from about 10,000 to 250,000. It may also be an interpolymer containing an unsaturated compound such as maleic acid, vinyl alcohol, or the like. In the monomeric mixture, the amount of maleic acid or the like may be from 5 to 15% providing the amount of vinyl chloride in the polymer is within the above range.

The colloidal silica used in this composition may contain particles having an average diameter not exceeding about 0.1 micron or less than about 0.001 micron. However, it is preferred to use colloidal silica having a particle size of about 0.03 micron and preferably in the range of from 0.01 to 0.03 micron.

The following is my preferred formulation.

| | Percent, by weight |
|---|---|
| 13% vinyl acetate–86% vinyl chloride polymer | 15 |
| Colloidal silica | 3 |
| Ultraviolet absorber | 2 |
| 2-nitropropane | 30 |
| Toluene | 25 |
| Xylene | 20 |

The vinyl acetate-vinyl chloride resin may be within 15–20% by weight, solids basis, colloidal silica 1–4% by weight solids basis, ultraviolet absorber 0–3% by weight. The total solvent mixture may be from 85–75% by weight and can be formulated of various well-known organic volatile solvents other than those used in our preferred embodiment. The coating composition may be applied by spray, brush, roller, doctor blade, air brush, or wiping techniques to photographic print surfaces to obtain the desired textured characteristics.

A suitable ultraviolet absorber which may be used is 2,2'-dihydroxy-4,4'-dimethoxy benzophenone. However, a large number of other ultraviolet absorbers may be used either alone or in combination.

In the event that other proportions are used, a different result would be obtained so that the proportions are relatively critical. Use of a larger solvent proportion than that described would not obtain a thioxotropic effect and would then provide a non-textured surface.

The invention has been described in detail with particular reference to preferred embodiments thereof, but it will be understood that variations and modifications can be effected within the spirit and scope of the invention as described hereinabove and as defined in the appended claims.

I claim:
1. A coating composition containing 15% by weight vinyl acetate-vinyl chloride copolymer having a molecular weight of 10,000 to 250,000, 3% by weight colloidal silica, 2% by weight 2,2'-dihydroxy-4,4'-dimethoxy benzophenone as an ultraviolet absorber, 30% by weight 2-nitropropane, 25% by weight toluene, and 20% by weight xylene.

2. A photographic print having a protective coating thereon comprising a vinyl acetate-vinyl chloride resin containing 1–4%, based on the weight of the resin, of colloidal silica.

3. A photographic print having a protective coating thereon comprising a vinyl acetate-vinyl chloride copolymer having a molecular weight of 10,000–250,000, and containing 1–4%, based on the weight of the copolymer, of colloidal silica the particles of which have an average diameter of less than 0.1 micron.

4. A photographic print having a protective coating thereon comprising a vinyl acetate-vinyl chloride copolymer containing at least 70% by weight vinyl chloride and having a molecular weight of 10,000–250,000, and containing 1–4%, based on the weight of the copolymer, of colloidal silica the particles of which have an average diameter of 0.01–0.03 micron.

5. A photographic print having a protective coating thereon comprising a vinyl acetate-vinyl chloride copolymer containing at least 70% by weight vinyl chloride and having a molecular weight of 10,000–250,000, 1–4% based on the weight of the copolymer of colloidal silica, the particles of which have an average diameter of 0.01–0.03 micron, and 0–3%, based on the weight of the copolymer, of a compatible ultraviolet absorber.

6. A photographic print having a protective coating thereon comprising a vinyl acetate-vinyl chloride copolymer containing at least 70% by weight vinyl chloride and having a molecular weight of 10,000–250,000, 1–4% based on the weight of the copolymer of colloidal silica, the particles of which have an average diameter of 0.01–0.03 micron, and 0–3%, based on the weight of the copolymer, of 2,2′-dihydroxy-4,4′-dimethoxy benzophenone as an ultraviolet absorber.

References Cited by the Examiner

UNITED STATES PATENTS

| | | | |
|---|---|---|---|
| 1,932,887 | 10/33 | Groff | 260—87.1 |
| 2,013,867 | 9/35 | Sloan | 96—48 |
| 2,319,852 | 5/43 | Doolittle | 117—161 |
| 2,322,037 | 6/43 | Lindquist | 96—94 X |
| 2,538,378 | 1/51 | Overton | 117—41 X |
| 2,719,791 | 10/55 | Land | 96—29 |
| 2,739,971 | 3/56 | Sawdey et al. | 96—48 X |
| 2,935,422 | 5/60 | Chester et al. | 117—70 |
| 3,046,128 | 7/62 | Klimkowski | 96—49 |

FOREIGN PATENTS

| | | |
|---|---|---|
| 810,570 | 3/59 | Great Britain. |
| 1,183,396 | 7/59 | France. |

NORMAN G. TORCHIN, *Primary Examiner.*

PHILIP E. MANGAN, *Examiner.*